Jan. 3, 1933.   F. A. SCHMITZ   1,893,041
WEIGHING SCALE
Filed Feb. 7, 1929    4 Sheets-Sheet 1

Inventor
Fred A. Schmitz
By William Isler
Attorney

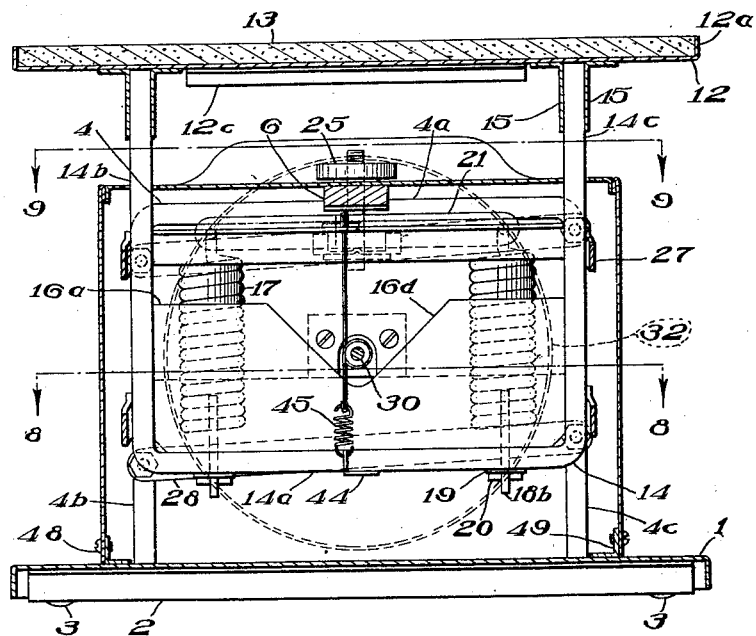

Jan. 3, 1933.  F. A. SCHMITZ  1,893,041

WEIGHING SCALE

Filed Feb. 7, 1929    4 Sheets-Sheet 3

Inventor

Fred A. Schmitz

By William Isler
Attorney

Jan. 3, 1933.   F. A. SCHMITZ   1,893,041
WEIGHING SCALE
Filed Feb. 7, 1929   4 Sheets-Sheet 4
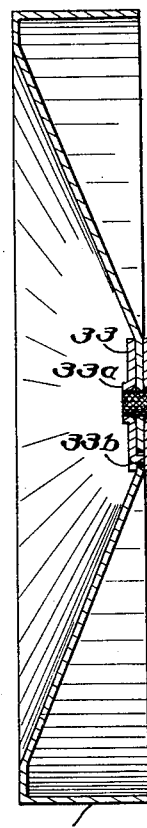
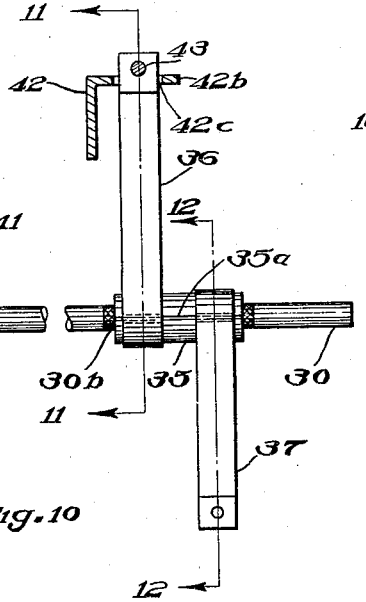
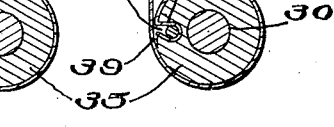
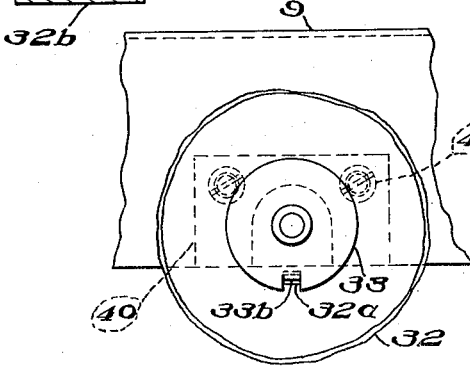
Fig. 10
Fig. 14
Fig. 11
Fig. 12
Fig. 13
Inventor
Fred A. Schmitz
By William Isler
Attorney Patented Jan. 3, 1933

1,893,041

UNITED STATES PATENT OFFICE

FRED A. SCHMITZ, OF CANTON, OHIO

WEIGHING SCALE

Application filed February 7, 1929. Serial No. 338,153.

This invention relates to scales, and more particularly to a so-called personal weight scale, embodying a number of improvements on the scale shown and described in Patent No. 1,686,770, granted to me October 9, 1928.

A primary object of the invention is to provide a novel construction that may be made from stamped metal parts, thereby not only simplifying manufacture and avoiding the use of castings, but also facilitating assembly. One of the essential requisites of a scale of the type set forth is steadiness and stability, and by making the various parts of substantial pressed or stamped metal, failures due to faulty castings are entirely eliminated, while at the same time the parts may be arranged and distributed in such a manner that the steadiness of the platform is preserved in balancing and sustaining the superposed weight of an individual.

Another object of the invention is to provide a novel arrangement of parts for causing the platform supports to move vertically without undue side motion or unequal distortion of the springs, thereby avoiding unnecessary friction or dragging of parts frequently occurring in similar devices.

A further object of the invention is to provide a novel spring suspension and means for adjusting the springs by a single, easily accessible and manually operated adjustable device.

A still further object of the invention is to provide a simple and reliable means for calibrating each of the platform suspension springs.

A still further object of the invention is to provide a simple, efficient and easily assembled mechanism for translating vertical movement of the platform into rotary movement of the dial shaft and dial.

A still further object of the invention is to provide positive, readily assembled means for attaching the dial to the dial shaft.

With the above and other objects in view which will be more readily apparent as the nature of the invention is better understood, the same consists in the novel construction, combination and arrangement of parts hereinafter more fully described, illustrated and claimed.

A preferred and practical embodiment of the invention is shown in the accompanying drawings, in which:—

Fig. 3 is a longitudinal cross-section through the scale, taken on the line 3—3 of Figs. 1 and 2;

Fig. 4 is a full-size elevation of the spring suspension and associated parts;

Fig. 5 is a cross-section, taken on the line 5—5 of Fig. 4;

Fig. 6 is a perspective view of the suspension plate;

Fig. 7 is a typical enlarged fragmentary cross-section through the link connections, showing the novel method of connecting the links with the frame or the pedestal member;

Fig. 10 is a full-size view, partly in elevation and partly in section, showing the dial operating mechanism and the novel method of securing the dial to the dial shaft;

Fig. 11 is an enlarged cross-section through the dial shaft, taken on the line 11—11 of Fig. 10;

Fig. 12 is an enlarged cross-section through the dial shaft, taken on the line 12—12 of Fig. 10;

Fig. 13 is a full-size fragmentary front elevation of the dial, showing the method of securing the dial to the dial shaft, and Fig. 14 is a full-size elevation of one of the spring clips for securing the lower ends of the springs to the pedestal member.

Figure 1:
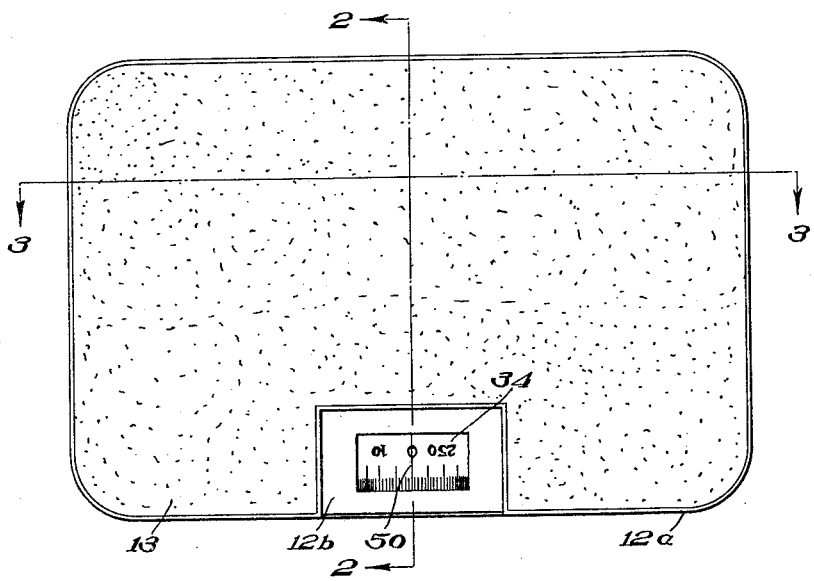
Fig. 1 is a top plan view of the scale.
Figure 2:
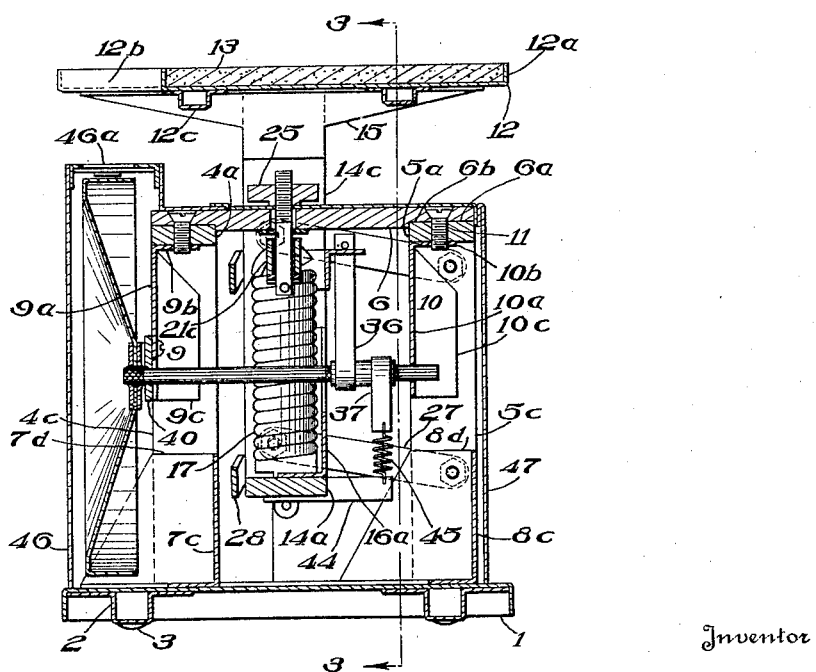
Fig. 2 is a transverse cross-section through the scale, taken on the line 2—2 of Fig. 1.

Referring more particularly to the drawings, wherein similar reference characters designate corresponding parts throughout the several figures, the present device includes a supporting base 1, having secured to the lower surface thereof longitudinally extending channels 2, the webs of which are provided with spaced extrusions 3, which serve as feet.

The frame for supporting the various movable parts comprises spaced inverted U-shaped members 4 and 5, a cross-member 6, braces 7 and 8 and bearing plates 9 and 10. The member 4 consists of a web $4a$ and legs $4b$ and $4c$, which rest upon the upper surface of base 1. The member 5 consists of a web $5a$ and legs $5b$ and $5c$, which also rest upon the upper surface of base 1. Brace 7 consists of horizontal flanges $7a$ and $7b$, which are secured as by spot welding to base 1 and vertical flanges $7c$ and $7d$, the flanges $7d$ being secured as by spot welding to legs $4b$ and $4c$ of the member 4. Brace 8 consists of horizontal flanges $8a$ and $8b$, which are secured as by spot welding to the base 1 and vertical flanges $8c$ and $8d$, the flanges $8d$ being secured as by spot welding to legs $5b$ and $5c$ of member 5. The members 4 and 5 are maintained in spaced relation by means of a cross-member 6, the ends of which are cut away as at $6a$ to provide shoulders $6b$, which abut the webs $4a$ and $5a$ of the members 4 and 5 respectively. The cross-member 6 is rigidly connected to the webs $4a$ and $5a$ by means of screws 11. Bearing plate 9 consists of a vertical web $9a$, horizontal flange $9b$ and vertical flanges $9c$, the flange $9b$ being secured as by spot welding to web $4a$ and flanges $9c$ being secured as by spot welding to the legs $4b$ and $4c$ of the member 4. Bearing plate 10 consists of a vertical web $10a$, horizontal flange $10b$ and vertical flanges $10c$, the flange $10b$ being secured as by spot welding to web $5a$ and the flanges $10c$ being secured as by spot welding to the legs $5b$ and $5c$ of member 5.

The aforesaid construction results in a supporting frame, which is light in weight, extremely rigid and stable, and which, in addition, may be quickly and inexpensively manufactured and assembled in mass quantities.

A platform 12 having an upturned edge flange $12a$ is cut away to form a recess $12b$, and the pan-like recess, formed by the flange, is utilized to hold a covering of linoleum or similar substance 13. Longitudinally extending shallow channels $12c$ are secured as by spot welding to the lower surface of platform 12 to provide additional strength for the platform.

A U-shaped pedestal 14, consisting of a horizontal web $14a$ and legs $14b$ and $14c$ is rigidly secured to the platform 12 by means of angle braces 15, the legs of which are secured as by spot welding to the platform 12 and the legs $14b$ and $14c$ of the pedestal 14, as shown in Fig. 3.

Secured as by spot welding to the pedestal 14 is a brace 16, consisting of a web $16a$, horizontal flange $16b$ and vertical flanges $16c$, the web $16a$ having a V-shaped notch $16d$ therein. This brace materially adds to the rigidity of the pedestal.

The platform 12 is resiliently supported in its uppermost position by means of coil springs 17, the lower convolutions of which are screwed into semi-circular notches $18a$ of spring clips 18, as shown in Fig. 14. Spring clips 18 are blanked from sheet metal and terminate in tongues $18b$, provided with holes $18c$. The tongues $18b$ extend through holes $14d$ in the web $14a$ of pedestal 14, and are retained in place by means of washers 19 and cotter pins 20, which are inserted through the holes $18c$. The use of the spring clips 18 affords a simple and reliable means for increasing or decreasing the number of effective convolutions of the springs 17 for the purpose of calibrating them.

The springs 17 are suspended from the ends of a yoke 21, the medial portion of which is offset as at $21a$. The yoke 21 also includes a short bar $21b$ secured thereto as by spot welding and having an oppositely offset portion $21c$, the two offset portions defining a circular opening $21d$. The yoke 21 is supported upon a suspension plate 22, see Figs. 4, 5 and 6, provided at its ends with upturned guide flanges $22a$ which slidably embrace the yoke, and with medially disposed raised bearings $22b$, which are in contact with the offset portions $21a$ and $21c$ of the yoke. The suspension plate 22 is in turn supported upon a hardened round steel pin 23, which is inserted through the square body $24a$ of an adjusting screw 24, whose upper portion extends through a circular opening $6c$ in the cross-member 6, and is threaded to receive an adjusting nut 25. For the purpose of preventing rotation of the screw 24, a plate 26 is secured as by spot welding to the lower surface of the member 6 and is provided with a square opening $26a$, through which the square body $24a$ of the screw 24 extends.

By virtue of the above-described yoke suspension means, the yoke 21 is free to turn on the bearings $22b$ or on pin 23, thereby permitting a limited degree of universal motion of the yoke and free and undistorted extension of the coil springs 17, when the scale is in use.

For the purpose of maintaining the pedestal 14 in a vertical position at all times, a link mechanism is employed. This mechanism comprises links 27 and 28 and connecting screws 29. Links 27 are connected at one end to legs $5b$ and $5c$ of member 5, and at the other end to legs $14b$ and $14c$ of pedestal 14, the connection at all points being made by means of screws 29. Links 28 are connected at one end to leg $14c$ of pedestal 14 and at the other end to leg $4b$ of member 4, the connection at all points being made by means of screws 29.

Figure 8:
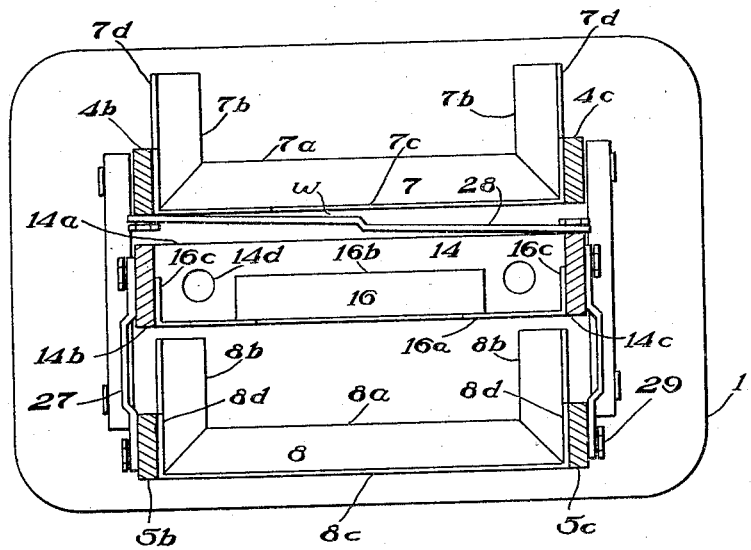
Fig. 8 is a horizontal cross-section through the scale, taken on the line 8—8 of Fig. 3 with certain parts omitted for clearness of illustration.
Figure 9:
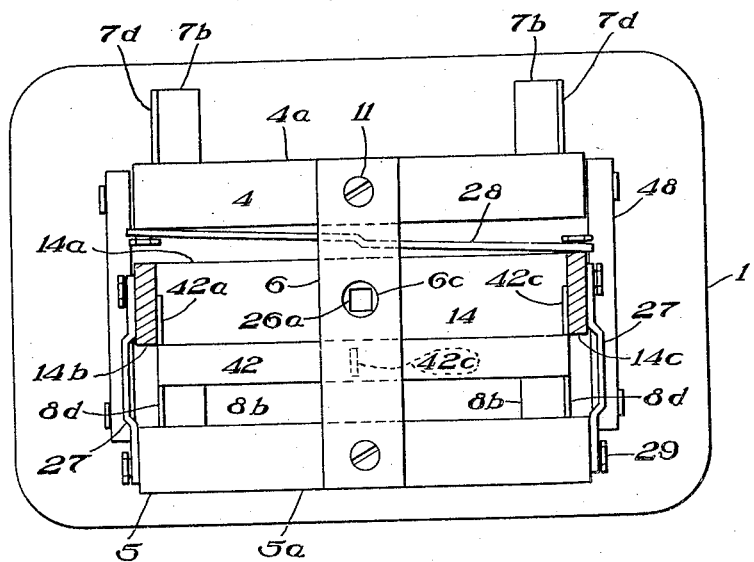
Fig. 9 is a horizontal cross-section through the scale, taken on the line 9—9 of Fig. 3 with certain parts omitted for clearness of illustration.

In the use of the scale, when the pedestal 14 moves downward, it must, of necessity, move forward and sideward to a certain extent, and in order to permit this forward and sideward motion, the screws 29 are designed to allow a certain amount of universal motion of the links. To this end, each screw 29 is provided intermediate its ends with a spherical portion 29a, upon which the links bear, the amount of universal motion of the links being limited by the amount of clearance w, as shown in Figs. 7, 8 and 9.

The dial mechanism, the assembly of which is an important feature of the invention, is assembled in the following manner:

A dial shaft 30 is knurled as at 30a and a washer 31 having a hub 31a is pressed onto this knurled portion of the shaft. A dial 32, preferably of sheet aluminum, is then placed on the shaft adjacent the washer 31. A second washer 33 having a hub 33a and an inwardly pressed tongue 33b is then pressed onto the shaft, the tongue entering a hole 32a in the dial 32. Both washers are then securely soldered to the shaft, the hubs 31a and 33a, and the knurling 30a affording a means of obtaining an excellent soldered joint. The tongue 33b of the washer 33 prevents relative rotary movement between the dial and the shaft. The peripheral surface 32b of the dial is provided with a paper tape having thereon a scale 34, as shown in Fig. 1.

The dial shaft 30 is also knurled as at 30b, and a pulley 35, preferably made of brass, provided with a longitudinally extending groove 35a is pressed onto this knurled portion and soldered thereto. Metallic ribbons 36 and 37 are provided at one end with open loops 36a and 37a respectively, and at their opposite ends with reinforcements 36b and 37b, the ribbons and reinforcements being provided with perforations 36c and 37c.

In securing the ribbons 36 and 37 to the pulley 35, the loops 36a and 37a are inserted into the groove 35a, a wire 38 is passed through both loops, and the metal surrounding the groove is compressed to securely grip both wire and loops, as shown at 39 in Figs. 11 and 12. The wire 38 is then soldered to the pulley.

In order to obtain the degree of flexibility desired, the ribbons 36 and 37 are made of metal approximately .0025 inches thick. In practice, the metallic ribbons should not exceed .003 inches in thickness. The slight resistance to bending, which is obtained by the use of ribbons of this thickness, permits the ribbons to be partially wound around the pulley in such a manner that the slightest uncoiling of the ribbons is sufficient to cause rotation of the dial shaft.

The dial shaft 30 is supported by the web 10a of the bearing plate 10, and by a plate 40, which is secured to the web 9a of the bearing plate 9, as by means of screws 41. The use of the independent bearing plate 40 facilitates the assembly of the dial mechanism.

An angle support 42 extends between the legs 14b and 14c of the pedestal 14 and is provided with flanges 42a, which are secured as by spot welding to the said legs. The horizontal flange 42b of the angle support has a rectangular slot 42c therein, through which the reinforced ends 36b of ribbon 36 is inserted and secured against retraction by means of a cotter pin 43.

An angle plate 44 is secured as by spot welding to the web 14a of the pedestal 14 and the reinforced end 37b of the ribbon 37 is resiliently connected thereto by means of a small coil spring 45.

In the use of the scale, it will be apparent that downward movement of the platform 12 will cause an uncoiling of the ribbon 37 and a coiling of the ribbon 36, thereby resulting in rotation of the dial shaft and dial. The flywheel effect of the dial during rotation and reversal of rotation thereof is cushioned by the spring 45. The use of ribbons entirely eliminates lost motion, which is unavoidable in scales employing gears, or rack and pinion, and affords a positive method of translating the vertical movement of the platform into rotary movement of the dial shaft and dial, the slightest variation in the position of the platform resulting in a proportional movement of the reading scale 34.

The scale mechanism may be encased in a sheet-metal casing consisting of two telescoping parts 46 and 47, which are retained in position by means of screws 48 and angles 49, the latter being secured as by spot welding to the upper surface of base 1. The part 46 is provided with a glass window 46a, positioned directly under the recess 12b of the platform 12. The glass window is provided with a sight line 50 to assist in reading the scale 34.

By means of the adjusting nut 25, the zero mark on the scale 34 may be set to coincide with the sight line 50 on the glass window 46a. This nut, being positioned outside the casing 46, 47 is readily accessible to the user of the scale.

From the foregoing it will be apparent that the present construction provides an arrangement which will fulfill the objects set forth herein and provides a simple, practical and reliable device.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a weighing scale, a frame including spaced inverted U-shaped members having transverse web portions, and a cross-member bridging the space between said U-shaped members and secured to the web portions thereof.

2. In a weighing scale, a frame including spaced inverted U-shaped members having vertical legs and transverse web portions, and a cross-member bridging the space between said U-shaped members and secured to the web portions thereof.

3. A structure as defined in claim 2, in which brace members are secured to the vertical legs of the U-shaped members.

4. A structure as defined in claim 2, in which bearing plate members are secured to the U-shaped members.

5. In a weighing scale, a platform, a pedestal member for supporting the platform including spaced legs and a transverse connecting web, springs connected to said transverse web, means for suspending said springs and means for permitting universal movement of said spring-suspension means, including a suspension plate.

6. A structure as defined in claim 5, in which the means for permitting universal movement of the spring-suspension means includes a suspension plate having raised bearing portions.

7. A structure as defined in claim 5, in which the means for permitting universal movement of the spring-suspension means includes a suspension plate and a rocker pin.

8. A structure as defined in claim 5, in which the means for permitting universal movement of the spring-suspension means includes a suspension plate having raised bearing portions and a rocker pin.

9. In a weighing scale, a frame, a pedestal member, and link mechanism including links and means for connecting said links to the frame and pedestal, said means permitting a limited degree of universal movement of the links, but not permitting lost motion between the frame and pedestal.

10. A structure as defined in claim 9, in which the last-named means comprises screws having spherical portions.

11. In a weighing scale, a stamped metal base and a supporting frame including stamped metal U-shaped members and stamped metal braces rigidly securing said U-shaped members to said base.

12. In a weighing scale, a stamped metal base, a supporting frame including stamped metal U-shaped members and stamped metal braces rigidly securing said U-shaped members to said base, and stamped metal bearing plates secured to said U-shaped members.

13. In a weighing scale, a platform, a pedestal member for supporting the platform, springs supporting said pedestal member, a yoke supporting said springs, and means for supporting said yoke and permitting movement thereof in at least two planes.

14. In a weighing scale, a platform, a pedestal member for supporting the platform including spaced legs and a transverse connecting web, springs connected to said transverse web, a yoke for suspending said springs, and means for suspending said yoke and permitting movement thereof in at least two planes.

15. In a weighing scale, a pedestal, a dial shaft, and means for translating the vertical movement of said pedestal into rotary movement of the dial shaft, said means including metallic ribbons each provided at one end with an open loop.

16. In a weighing scale, a pedestal, a dial shaft provided with a pulley having a longitudinal groove therein, and means for translating the vertical movement of said pedestal into rotary movement of the dial shaft, said means including metallic ribbons each provided at one end with a loop which is located in said groove.

17. In a weighing scale, a pedestal, a dial shaft provided with a pulley having a longitudinal groove therein, and means for translating the vertical movement of said pedestal into rotary movement of the dial shaft, said means including metallic ribbons each provided at one end with a loop which is located in said groove and a wire extending through said loops.

In testimony whereof I affix my signature.

FRED A. SCHMITZ.